United States Patent
McLeod

(10) Patent No.: US 7,509,205 B2
(45) Date of Patent: Mar. 24, 2009

(54) SPEED CONTROL SYSTEM FOR A VEHICLE

(75) Inventor: Paul Warren McLeod, Martinez, GA (US)

(73) Assignee: Club Car, Inc., Evans, GA (US)

( * ) Notice: Subject to any disclaimer, the term of this patent is extended or adjusted under 35 U.S.C. 154(b) by 639 days.

(21) Appl. No.: 10/983,915

(22) Filed: Nov. 8, 2004

(65) Prior Publication Data

US 2005/0149246 A1    Jul. 7, 2005

Related U.S. Application Data

(60) Provisional application No. 60/518,025, filed on Nov. 7, 2003.

(51) Int. Cl.
| | |
|---|---|
| B60T 8/32 | (2006.01) |
| G05D 1/00 | (2006.01) |
| G06F 7/00 | (2006.01) |
| G06F 17/00 | (2006.01) |

(52) U.S. Cl. .............. 701/93; 701/79; 701/96; 123/328; 123/330; 123/339.23; 123/375; 123/398; 123/406.53; 123/443; 123/462; 123/583; 123/584; 123/319; 477/42; 477/91; 477/206; 477/905

(58) Field of Classification Search ............ 701/93, 701/79, 96; 180/315; 74/513, 478, 479.01, 74/482; 123/352–361, 328, 330, 339.23, 123/375, 398, 406.53, 443, 462, 583, 584, 123/319; 116/57–62.4, 28 A, 74; 477/42, 477/91, 206, 905

See application file for complete search history.

(56) References Cited

U.S. PATENT DOCUMENTS

| | | | | |
|---|---|---|---|---|
| 2,945,547 | A | * 7/1960 | Bunker | 180/172 |
| 3,461,988 | A | * 8/1969 | Jacobson | 180/174 |
| 3,721,221 | A | * 3/1973 | Okada | 123/328 |
| 4,272,459 | A | * 6/1981 | Berger | 261/34.3 |
| 4,445,473 | A | * 5/1984 | Matsumoto | 123/308 |
| 4,510,902 | A | * 4/1985 | Tsuchida et al. | 123/325 |
| 4,523,564 | A | * 6/1985 | Sturdy | 123/361 |
| 4,736,814 | A | * 4/1988 | Yogo et al. | 180/197 |
| 4,838,780 | A | * 6/1989 | Yamagata et al. | 123/352 |
| 4,862,367 | A | * 8/1989 | Tada et al. | 701/93 |
| 4,905,785 | A | * 3/1990 | Kieffer et al. | 180/177 |
| 4,914,597 | A | * 4/1990 | Moncelle et al. | 701/95 |

(Continued)

*Primary Examiner*—Khoi Tran
*Assistant Examiner*—Jorge O Peche
(74) *Attorney, Agent, or Firm*—Michael Best & Friedrich LLP

(57) ABSTRACT

A speed control system is for a vehicle having an engine including a carburetor with a throttle plate moveable between a minimum open position and a maximum open position. The speed control system includes a ground speed limiter mechanism operatively coupled with the throttle plate and configured to displace the plate toward the minimum position as ground speed of the vehicle approaches a predetermined maximum value. An engine speed limiter mechanism is operatively coupled with the throttle plate and is configured to displace the plate toward the minimum position as a speed of the engine approaches a predetermined maximum value. Preferably, a control linkage is connected with the throttle plate and is moveable between a first configuration, at which the throttle plate is disposed at the minimum position, and a second configuration at which the throttle plate is disposed at the maximum position, the two limiter mechanisms displacing the linkage.

16 Claims, 13 Drawing Sheets

U.S. PATENT DOCUMENTS

| | | | |
|---|---|---|---|
| 5,031,715 A * | 7/1991 | Ogawa et al. | 180/179 |
| 5,105,657 A * | 4/1992 | Nakaniwa | 73/114.04 |
| 5,417,193 A * | 5/1995 | Fillman et al. | 123/352 |
| 5,510,990 A * | 4/1996 | Hibino et al. | 701/96 |
| 5,549,089 A * | 8/1996 | Snell et al. | 123/352 |
| 5,950,595 A * | 9/1999 | Yoshioka et al. | 123/295 |
| 6,062,197 A * | 5/2000 | Janic et al. | 123/357 |
| 6,253,143 B1 * | 6/2001 | Silvernagle et al. | 701/93 |
| 6,474,298 B2 * | 11/2002 | Kanno | 123/339.14 |
| 6,612,286 B1 * | 9/2003 | Houston | 123/376 |
| 2001/0032601 A1 * | 10/2001 | Galka et al. | 123/73 A |

\* cited by examiner

SPEED CONTROL SYSTEM FOR A VEHICLE

This application claims priority to U.S. Provisional Application Ser. No. 60/518,025, filed Nov. 7, 2003, the entire contents of which are incorporated herein by reference.

BACKGROUND OF THE INVENTION

The present invention relates to vehicles such as utility vehicles, golf cars and NEVS, and more particularly to mechanisms for limiting vehicle speed or engine speed.

Speed control systems for vehicles such as golf cars and utility vehicles are known and are used to limit the maximum speed of the vehicle. Generally, these speed control systems operate by either limiting maximum vehicle travel speed, or "ground" speed, or alternatively limiting the maximum speed of the vehicle engine.

SUMMARY OF THE INVENTION

In one aspect, the present invention is a speed control system for a vehicle, the vehicle having an engine including a carburetor with a throttle plate, the plate being moveable between a minimum open position and a maximum open position. The speed control system comprises a ground speed limiter mechanism operatively coupled with the throttle plate and configured to displace the plate toward the minimum position as ground speed of the vehicle approaches a predetermined maximum value. An engine speed limiter mechanism is operatively coupled with the throttle plate and is configured to displace the plate toward the minimum position as a speed of the engine approaches a predetermined maximum value.

In another aspect, the present invention is also a speed control system for a vehicle having an engine with a throttle plate, as discussed above. The speed control system comprises a control linkage connected with the throttle plate and moveable between a first configuration, at which the throttle plate is disposed at the minimum position, and a second configuration at which the throttle plate is disposed at the maximum position. A ground speed limiter mechanism is operatively connected with the control linkage and is configured to displace the link toward the linkage first position as the ground speed approaches a predetermined maximum vehicle speed value. An engine speed limiter mechanism is operatively connected with the control linkage and is configured to move the linkage toward the first configuration as the engine speed approaches a predetermined maximum engine speed value.

In a further aspect, the present invention is again a speed control system for a vehicle. The speed control system comprises an accelerator mechanism operatively coupled with the throttle plate and having an input member operable by a user. The accelerator mechanism is configured to displace the throttle plate between the minimum and the maximum positions to adjust vehicle ground speed. A ground speed limiter mechanism is operatively coupled with the throttle plate and is configured to displace the plate toward the minimum position as ground speed of the vehicle approaches a predetermined maximum value. Further, an idler is operatively coupled with the throttle plate and is configured to displace the throttle plate to an idle position, the idle position being located between the plate minimum and maximum positions so as to maintain a speed of the engine above a predetermined minimum value. Additionally, an engine speed limiter mechanism is operatively coupled with the throttle plate and is configured to displace the plate toward the minimum position as a speed of the engine approaches a predetermined maximum value.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
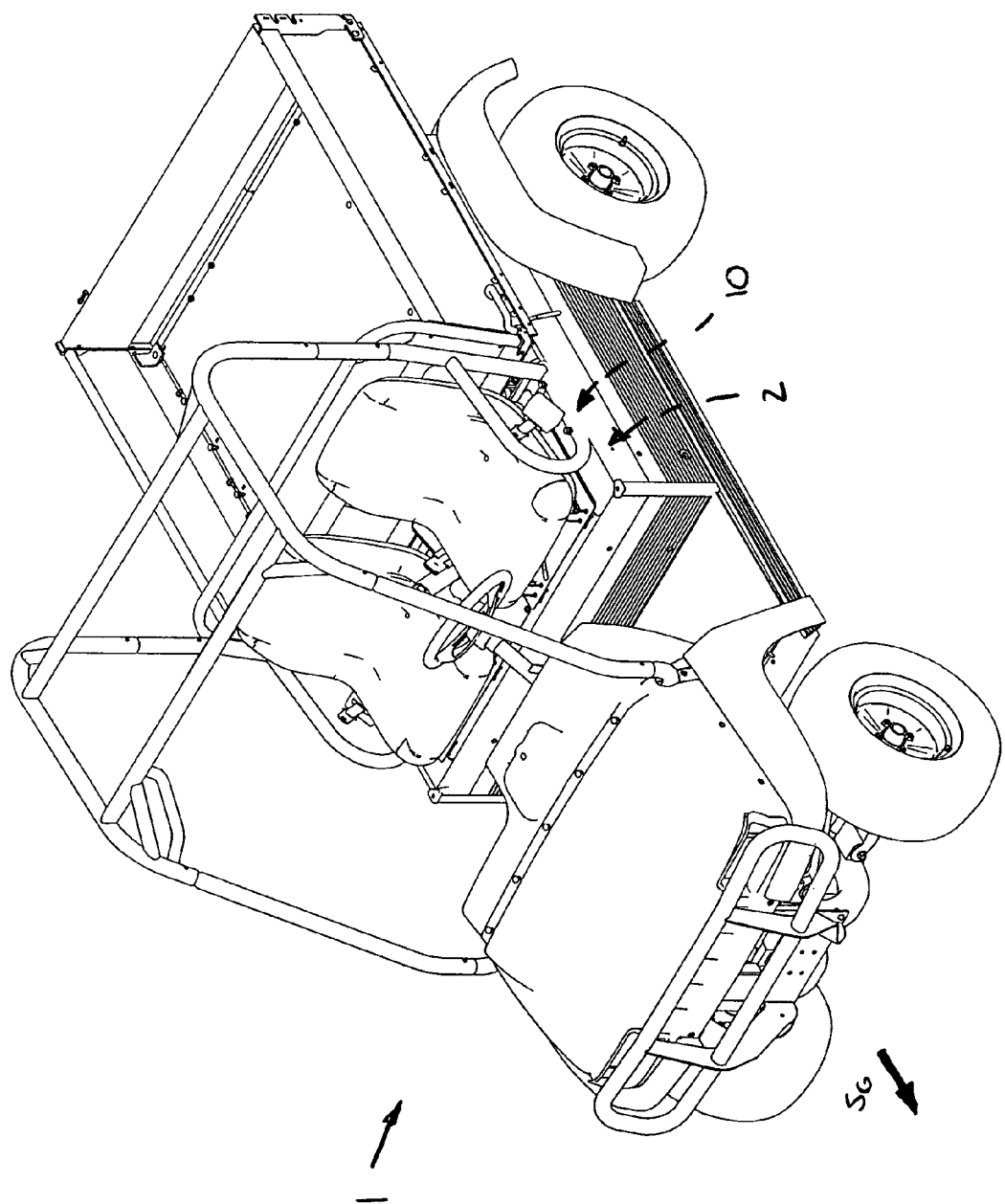
FIG. 1 is a perspective view of a vehicle incorporating a speed control system of the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import. Furthermore, it must be noted that the movement or orientation of certain components of the present invention are described with reference to two or more relative positions, each such position being depicted in the drawing figures by indication of a point on the component that has been selected for convenience of illustration only and of no particular relevance.

Referring now to the drawings in detail, wherein like numbers are used to indicate like elements throughout, there is shown in FIGS. 1-15 a speed control system 10 for a vehicle 1, the vehicle having an engine 2 including a carburetor 3 with an air intake port 4 and a throttle plate 5 controlling air flow into the port 4. The throttle plate 5 is moveable between a minimum open position $P_{MIN}$ (FIGS. 4 and 10) at which air flow into the engine 2 (and thus engine speed) is minimized, and a maximum open position $P_{MAX}$ (FIGS. 3 and 11) at which the air flow into the engine 2 (and engine speed) is maximized. The speed control system 10 basically comprises a ground speed limiter mechanism 12 configured to prevent vehicle ground speed $S_G$ from exceeding a predetermined maximum value and an engine speed limiter mechanism 14 configured to prevent a speed $S_E$ of the engine 2 from exceeding a predetermined maximum value. Specifically, the ground speed limiter mechanism or "GSL" mechanism 12 is operatively coupled with the throttle plate 5 and is configured to displace the plate 5 toward the minimum position $P_{MIN}$ as the value of the ground speed $S_G$ approaches the predetermined maximum value. Further, the engine speed limiter mechanism or "ESL" mechanism 14 is operatively coupled with the throttle plate 5 and is configured to displace the plate 5 toward the minimum open position $P_{MIN}$ as the engine speed $S_E$ approaches the predetermined maximum value.

Additionally, the speed control system 10 also comprises an accelerator mechanism 16 operatively coupled with the throttle plate 5 and having an input member 18 operable by a vehicle user (i.e., a driver), the accelerator mechanism 16 being configured to displace the throttle plate 5 between the closed and the maximum open positions to adjust vehicle ground speed. Preferably, the GSL mechanism 12 includes a moveable member 24 connected with the throttle plate 5 such that displacement of the moveable member 24 moves the throttle plate 5 between the minimum and maximum positions $P_{MIN}$, $P_{MAX}$, and the accelerator mechanism 16 is connected with the moveable member 24 and configured to displace the member 24 to move the throttle plate 5 between the two positions $P_{MIN}$, $P_{MAX}$. Furthermore, the speed control system 10 also preferably comprises an idler 20 operatively coupled with the throttle plate 5 and configured to maintain a minimum engine speed $S_E$. Specifically, the idler 20 is configured to displace the throttle plate 5 to an idle position $P_I$ (see FIG. 1), the idle position $P_I$ being located between the plate minimum and maximum open positions $P_{MIN}$, $P_{MAX}$. Preferably, the ESL mechanism 14 also includes a moveable member 26 operatively connected with the throttle plate 5 such that displacement of the moveable member 26 moves the throttle plate 5 between the minimum and maximum open positions $P_{MIN}$, $P_{MAX}$, and the idler 20 is connected with the moveable member 26 and configured to displace the member 26 to move the throttle plate 5 between the minimum and idle positions $P_{MIN}$, $P_I$.

Further, the speed control system 10 preferably further comprises a control linkage 22 connected with the throttle plate 5 and moveable between a first configuration (FIG. 12) and a second configuration (FIG. 13) so as to move the throttle plate 5 between the minimum and maximum open positions $P_{MIN}$, $P_{MAX}$. The control linkage 22 is operably coupled with the GSL mechanism 12 and with the ESL mechanism 14 such that each one of the two speed limiter mechanisms 12, 14 separately move the linkage 22 between the first and second configurations to thereby move the throttle plate 5. Additionally, the accelerator mechanism 16 and the idler 20 are each operably coupled with the control linkage 22 so as to separately move the linkage 22 between the first and second configurations, and thus move the throttle plate 5, preferably through the connected moveable member 24, 26 of the associated mechanism 12, 14, respectively.

More specifically, the control linkage 22 preferably includes a pivotable crank 30 connected with the throttle plate 5 and a push bar 32 and a spring shaft 34 each operatively connected with the crank 30. The crank 30 is connected with the throttle plate 5 such that pivotal displacement of the crank 30 displaces the plate 5 between the minimum and maximum open positions $P_{MIN}$, $P_{MAX}$. The push bar 32 is linearly displaceable along a linkage axis 23 between a first position $B_1$ (FIG. 10) and second position $B_2$ (FIG. 11) and is separately engageable with an output portion 36 of the GSL mechanism 12 and with an output portion 38 of the ESL mechanism 14. Further, the push bar 32 is displaceable toward the second position $B_2$ (FIG. 11) by movement of at least one engaged output portion 36 or 38 in a first direction $L_1$ generally toward the crank 30, such that the bar 32 pivots the crank 30 to move the throttle plate 5 toward the maximum open position $P_{MAX}$. Additionally, the spring shaft 34 has a first end 34a connected with the crank and a second end 34b connected with the output portion 38 of the ESL mechanism 14. The spring shaft 34 is configured to pivot the crank 30 to move the throttle plate 5 toward the minimum open position $P_{MIN}$ when the one engaged output portion 36 or 38 displaces in a second, opposing direction $L_2$ generally away from the crank 30, as discussed in further detail below.

Referring to FIGS. 2-5, 7 and 14, the GSL mechanism 12 preferably includes a ground speed sensor 40 having an output shaft 42, a control lever 44 mounted on the shaft 42, and a connector 46 extending between the lever 44 and the linkage push bar 32. The speed sensor shaft 42 has a central axis 43 and is angularly displaceable about the axis 43. The speed sensor 40 is configured to generate a torque $T_{GS}$ on the output shaft 42 in a first angular direction $A_1$ about the axis 43, the speed sensor torque $T_{GS}$ being proportional to ground speed $S_G$ and most preferably directly proportional to about the ground speed squared $(S_G^2)$, as described in further detail below. Further, the control lever 44 provides the GSL moveable member 24 and is pivotable about the shaft axis 43, the sensor torque $T_{GS}$ causing the shaft 42 to pivot the lever 44 in the first direction $A_1$. Furthermore, the connector 46 has a first end 46a connected with the control lever 44 and a second end 46b connected with the push bar 32. Preferably, the connector second end 46b includes a stop member 48 contactable with the push bar 32 to releasably engage the linkage 22, which thus provides the GSL output portion 36, as discussed above and in further detail below.

With the above GSL mechanism structure, the accelerator mechanism 16 is connected with the control lever 44 and is configured to generate an accelerator torque $T_A$ on the output shaft 42 in a second angular direction $A_2$ about the sensor shaft axis 43. As such, when the accelerator torque $T_A$ is greater than the ground speed sensor torque $T_{GS}$, the control lever 44 pivots in the second angular direction $A_2$ and displaces the connector second end 46b in a first direction $C_1$, such that the push bar 32 displaces the throttle plate 5 toward the maximum open position $P_{MAX}$. Alternatively, when the accelerator torque $T_A$ is lesser than the speed sensor torque $T_{GS}$, the control lever 44 pivots in the first angular direction $A_1$ and displaces the connector second end 46b in a second, opposing direction $C_2$, such that the spring shaft 34 displaces the throttle plate 5 toward the minimum open position $P_{MIN}$.

More specifically, the accelerator input member 18 preferably includes a moveable pedal 50 and the accelerator mechanism 16 further includes a connector 52 extending between the pedal 50 and the GSL mechanism control lever 44. The pedal 50 is displaceable between an initial position $I_I$ and a maximum displaced position $I_D$ and the connector 52 has a first end 52a connected with the pedal 50 and a second end 52b connected with the control lever 44. As such, displacement of the pedal 50 pivots the control lever 44 in the second direction $A_2$ about the shaft axis 43, the value of the accelerator torque $T_A$ increasing when the pedal 50 displaces toward the maximum displaced position $I_D$ and decreasing when the pedal 50 displaces toward the initial position $I_I$. Further, the ground speed sensor 40 is configured to increase the speed sensor torque $T_{GS}$ with increasing ground speed $S_G$ such that when the speed $S_G$ approaches the predetermined speed value $S_{GMAX}$, the value of the speed sensor torque $T_{GS}$ exceeds the value of the accelerator torque $T_A$. As such, the output shaft 42 rotates in the first direction $A_1$ to move the throttle plate 5 toward the minimum position $P_{MIN}$.

Referring to FIGS. 2-5, 8, 9 and 15, the ESL mechanism 14 preferably includes an engine speed sensor 60 having an output shaft 62, and a control lever 64 mounted on the output shaft 62 and coupled with the control linkage 22. The speed sensor shaft 62 has a central axis 63 and is angularly displaceable about the axis 63, and the engine speed sensor 60 is configured to generate a torque $T_{ES}$ on the output shaft 62 in a first angular direction $A_1$ about the shaft axis 63. This speed sensor torque $T_{ES}$ is proportional to the engine speed $S_E$, and is most preferably directly proportional to about the engine speed squared ($S_E^2$), as described in further detail below. Further, the control lever 64 provides the ESL moveable member 26 and is pivotable in opposing directions $A_1$, $A_2$ about the shaft axis 63, the sensor torque $T_{ES}$ causing the shaft 62 to pivot the lever 64 in the first direction $A_1$. Preferably, the lever 64 has an end 64a coupled with both the push bar 32 and with the spring shaft 34, the lever end 64a providing the ESL output portion 38, as discussed above and in further detail below.

With the preferred ESL mechanism structure, the idler 20 is connected with the control lever 64 and is configured to generate an idler torque $T_I$ on the output shaft 62 in a second, opposing angular direction $A_2$ about the sensor shaft axis 63. As such, when the idler torque $T_I$ is greater than the engine speed sensor torque $T_{ES}$, the control lever 64 pivots in the second direction $A_2$ to displace the push bar 32 to the bar second position $B_2$ so as to move the throttle plate 5 toward the maximum open position $P_{MAX}$. Alternatively, when the idler torque $T_I$ is lesser than the speed sensor torque $T_{ES}$, the control lever 64 pivots in the first direction $A_1$ to displace the spring shaft 34 so as to thereby move the throttle plate 5 toward the minimum position $P_{MIN}$.

Figure 2:
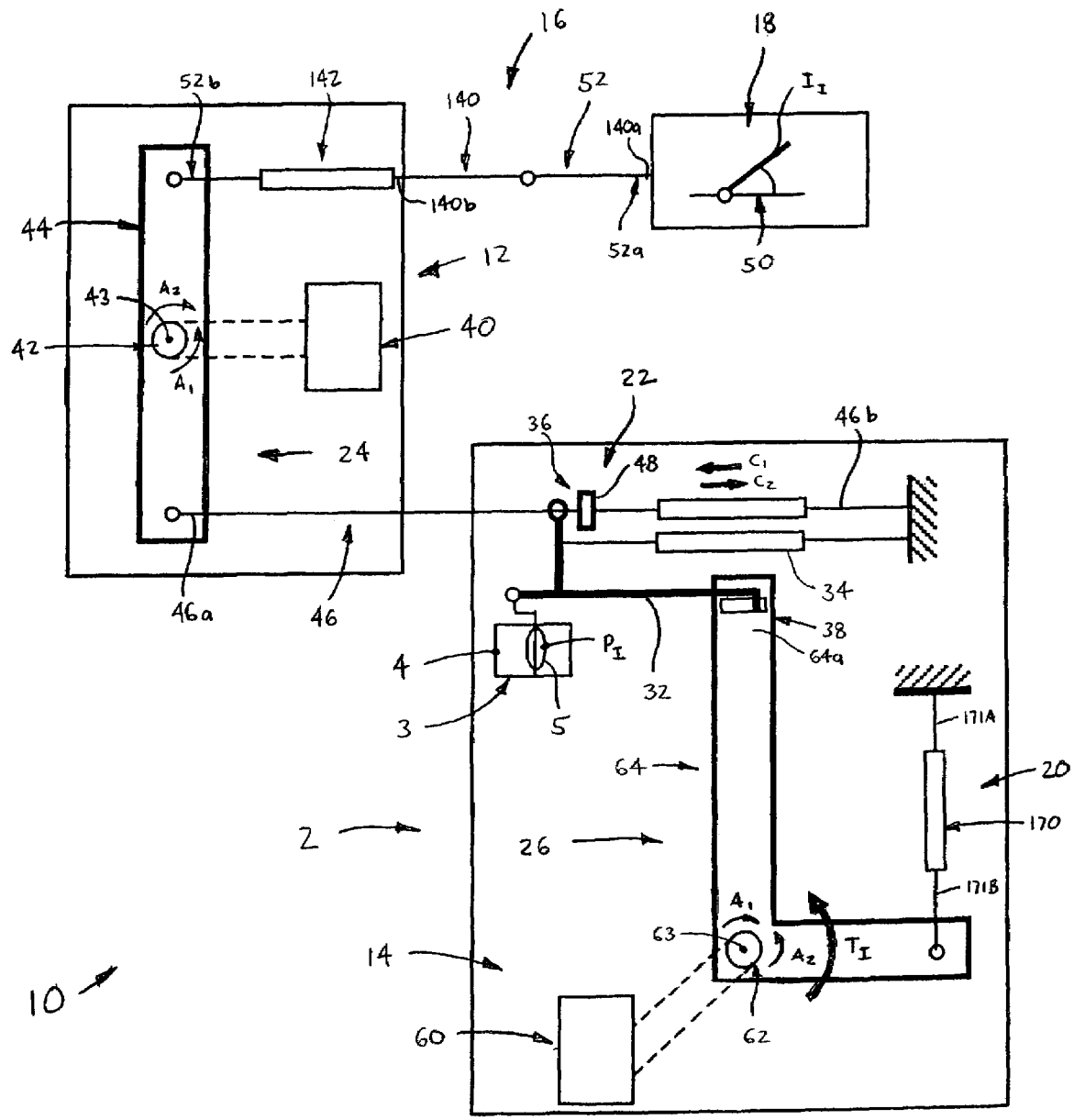
FIG. 2 is a diagrammatic view of the speed control system in accordance with the present invention, showing a throttle plate at an idle position.

The above-described speed control system 10 basically functions as follows. When the ground speed $S_G$ of the vehicle 1 is at or near zero (e.g., 0 mph) with the accelerator mechanism 16 being non-operational (i.e., pedal 50 not depressed), the GSL mechanism 12 is not active and thus does not operate the linkage 22 to move the throttle plate 5. As indicated in FIG. 2, the idler 20 exerts the idler torque $T_I$ on the ESL shaft 62, thereby pivoting the control lever 64 and displacing the push bar 32 to move the throttle plate 5 in a direction toward the maximum position $P_{MAX}$. As the engine speed $S_E$ increases due to the increased air flow into the carburetor port 4, the engine speed sensor torque $T_{ES}$ increases until the sensor torque $T_{ES}$ is about equal to the idler torque $T_I$. At this point, the throttle plate 5 is maintained at the idle position $P_I$ and the engine speed $S_E$ is maintained at a predetermined idle speed $S_{EI}$. If the engine 2 experiences an increased load, such as if a belt-driven alternator (not shown) is operated, the engine speed $S_E$ decreases, decreasing the sensor torque $T_{ES}$ and enabling the idler torque $T_I$ to displace the throttle plate 5 toward the maximum position $P_{MAX}$ to increase the engine speed $S_E$. The throttle plate 5 is displaced until the engine speed $S_E$ returns to about the predetermined idle speed $S_{EI}$, at which point the two torques $T_I$, $T_{ES}$ on the ESL mechanism shaft 62 are once again balanced. One advantage of such a mechanism for maintaining idle speed $S_I$ is that the system is generally independent of temperature changes, as is the case with mechanisms that merely position the throttle plate 5 to a specific idle position, and thus provides a more stable or constant idle speed.

Figure 3:
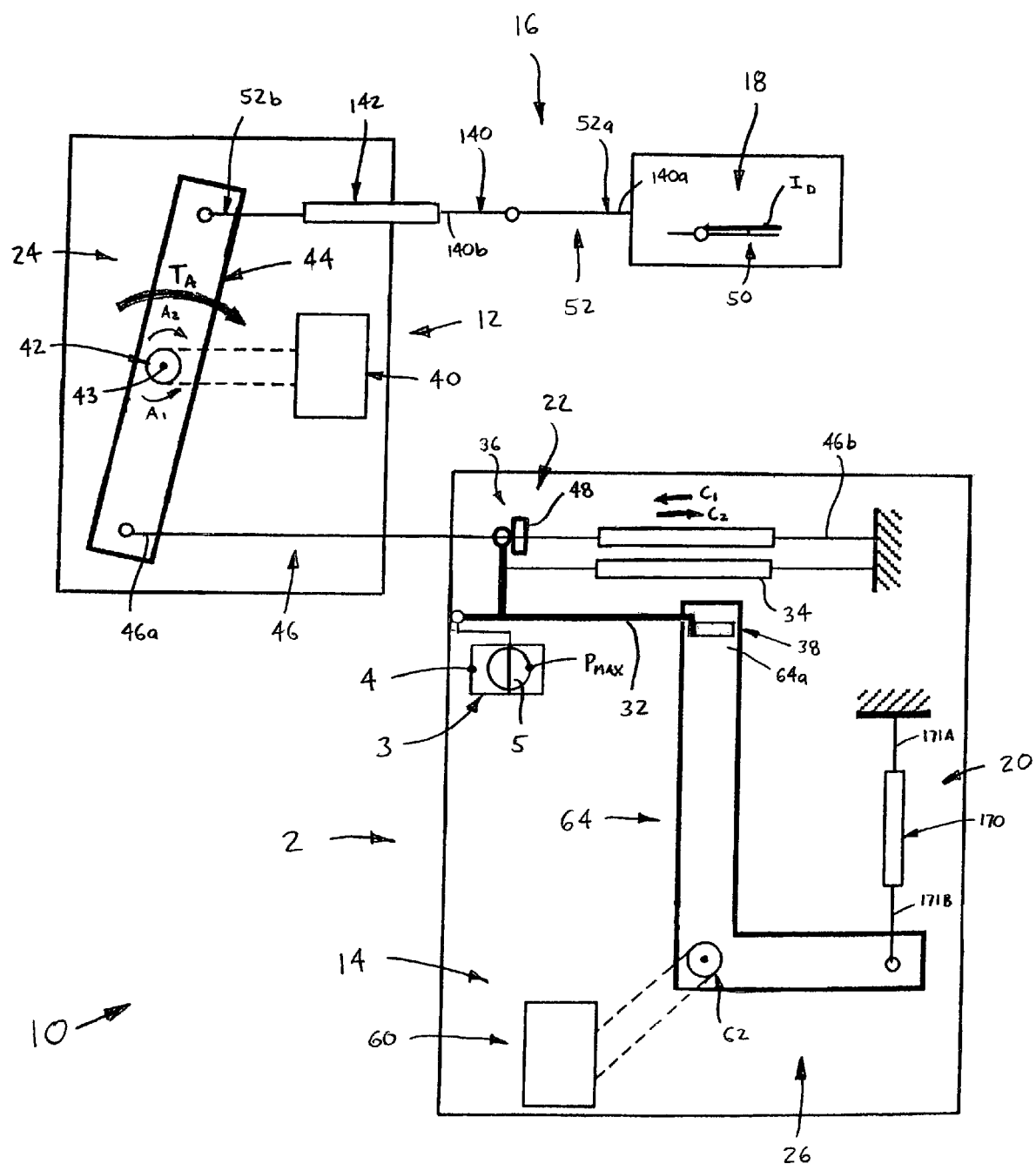
FIG. 3 is another view of the system of FIG. 2, showing the operation of an accelerator mechanism and the throttle plate at maximum open position.
Figure 4:
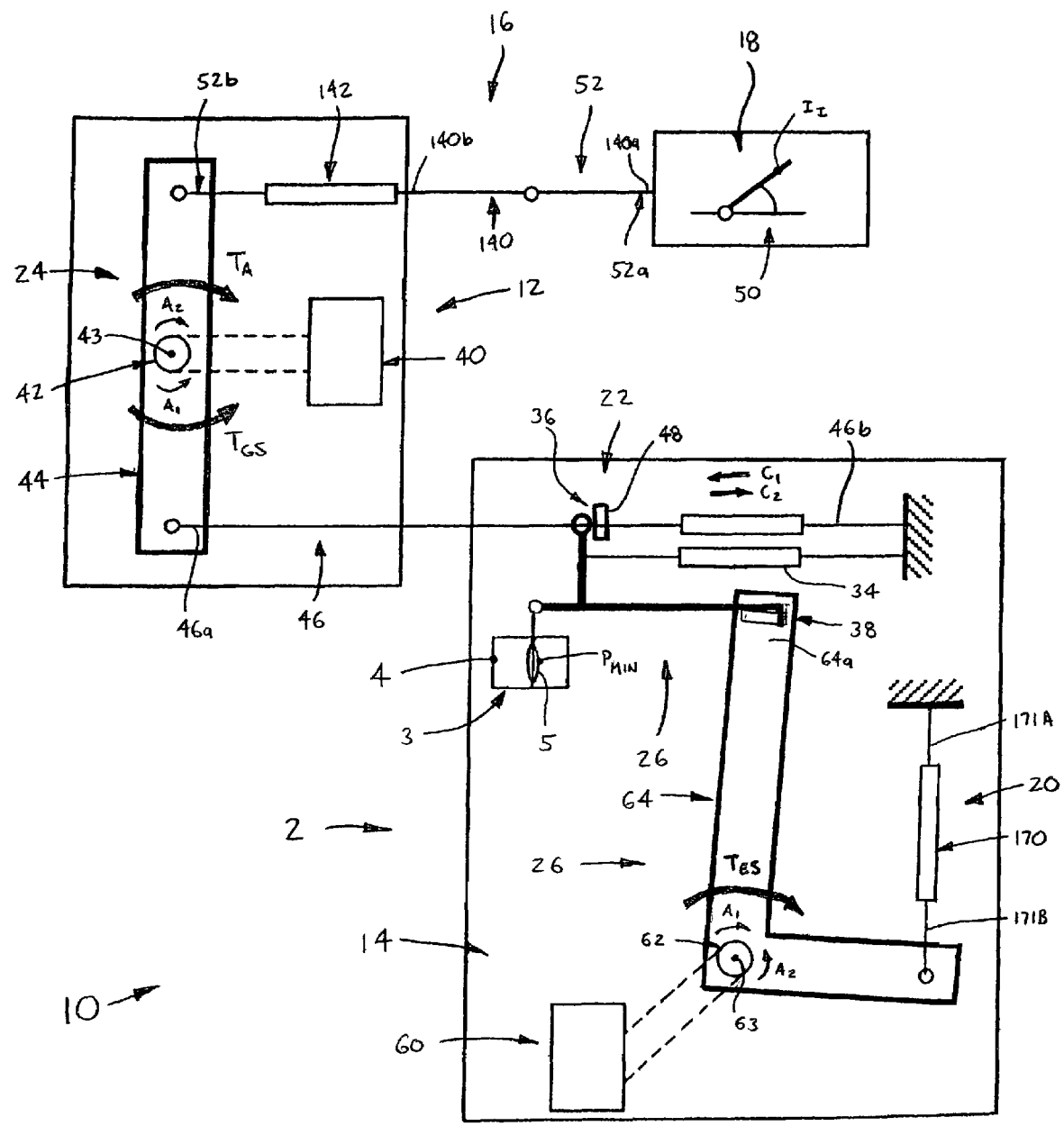
FIG. 4 is another view of the system of FIG. 2, showing the operation of an engine speed limiter mechanism and the throttle plate at a minimum open position.
Figure 11:
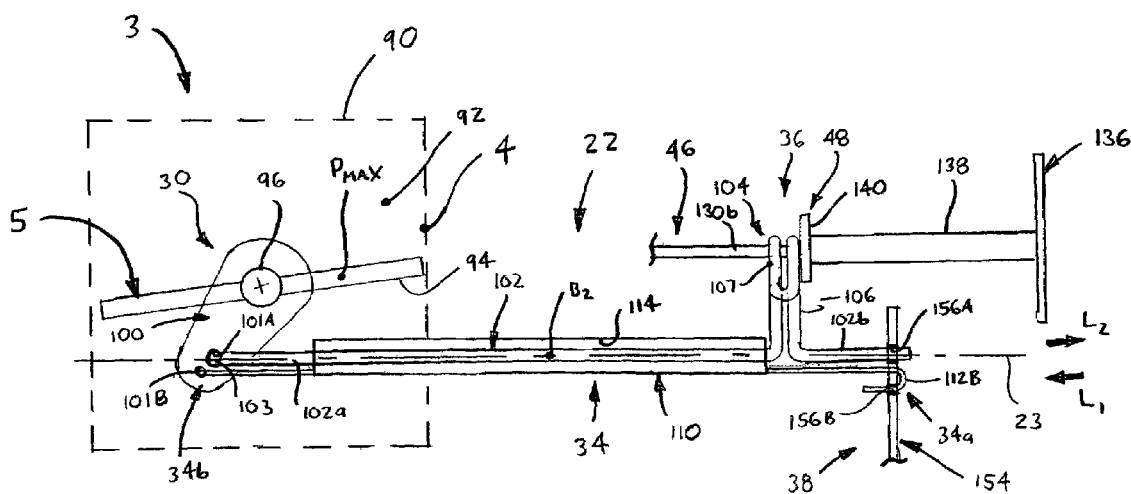
FIG. 11 is another view of the control linkage and mechanism portions of FIG. 10, showing the linkage in a second configuration.
Figure 12:
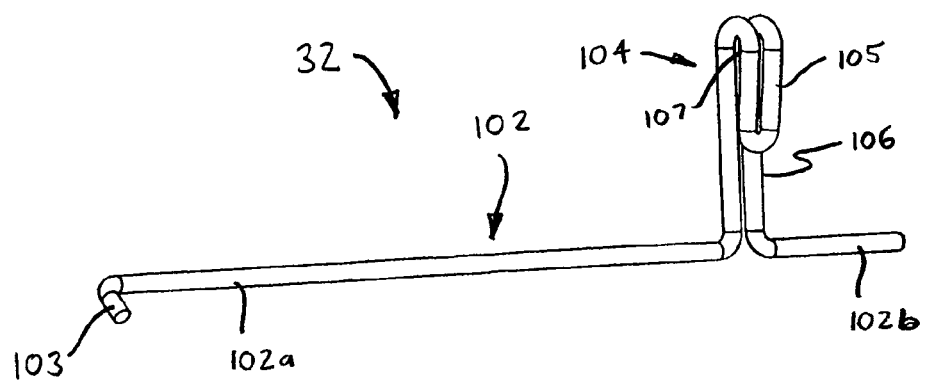
FIG. 12 is a greatly enlarged, perspective view of a push bar of a control linkage.
Figure 13:
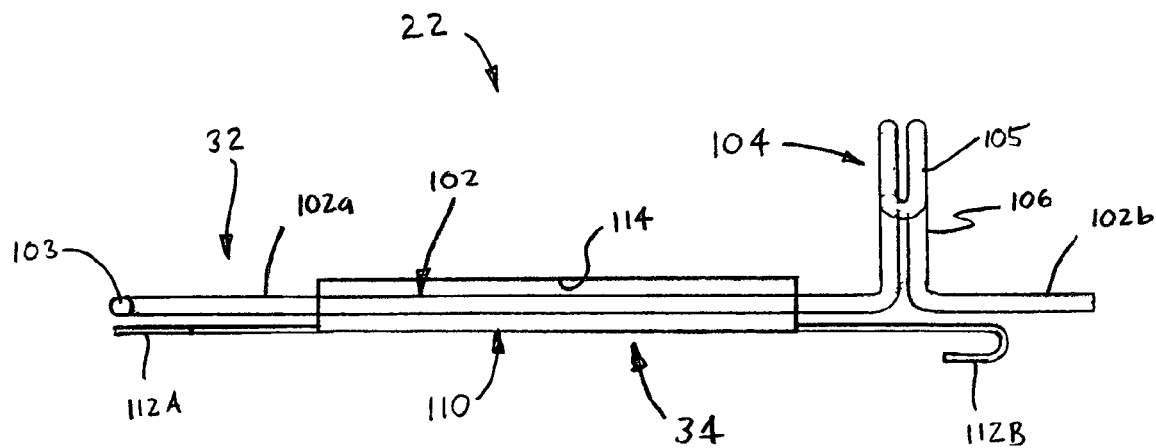
FIG. 13 is a greatly enlarged, side plan view of the push bar and a spring shaft of the control linkage.

When the accelerator mechanism 16 is operated (i.e., pedal 50 displaced), the accelerator torque $T_A$ initially causes the GSL mechanism shaft 42 to rotate and pivot the control lever 44 in the second direction $A_2$ about the shaft axis 43, as indicated in FIG. 3. As such, the connector stop 48 engages with and displaces the push bar 32 toward the bar second position $B_2$, displacing the throttle plate 5 toward the maximum position $P_{MAX}$ and increasing air flow to the engine 2, as best shown in FIG. 11. Both engine speed $S_E$ and the vehicle ground speed $S_G$ increase with increasing pedal displacement until either the ground speed $S_G$ approaches the predetermined maximum speed $S_{GMAX}$ or the engine speed $S_E$ approaches the predetermined maximum speed $S_{EMAX}$. When the engine speed $S_E$ approaches the maximum engine speed $S_{EMAX}$, the engine speed sensor torque $T_{ES}$ exceeds the idler torque $T_I$ and causes the ESL control lever 64 to pivot in the first angular direction $A_1$, thereby displacing at least a portion of the spring shaft 34 in the second direction $L_2$ along the linkage axis 23. Generally, such movement of the shaft 34 only moves the spring first end 34a and extends the spring 34, without displacing the throttle plate 5, unless the force on the linkage 22 from the accelerator mechanism 16 (exerted through the connector 46) is substantially balanced by the GSL mechanism 12 (i.e., $T_{GS} \sim T_A$). In such cases, the ESL lever 64 displaces the entire spring 34 to move the throttle plate 5 toward the minimum position $P_{MIN}$, as indicated in FIG. 4. Such movement of the spring shaft 34 also causes the push bar 32 to displace in the second direction $L_2$ against the connector stop 48, thereby pivoting the control lever 44 in the first direction $A_1$ about the shaft axis 43.

Additionally, when the ground speed $S_G$ approaches the maximum ground speed $S_{GMAX}$, the ground speed sensor 40 increases the torque $T_{GS}$ on the GSL mechanism shaft 42 such that the shaft 42 pivots the control lever 44 in the first direction $A_1$, thereby displacing the connector second end 46b generally away from the linkage crank 30. Such movement of the connector stop 48 permits the spring shaft 34, which becomes extended when the linkage 22 displaces the throttle plate 5 toward the maximum position $P_{MAX}$, to retract and pull the crank 30 generally in the second direction $L_2$ along the linkage axis 23, thereby moving the throttle plate 5 toward the minimum open position $P_{MIN}$ to reduce engine speed $S_E$ and thus vehicle speed $S_G$.

Having described the basic components and operating principles above, these and other aspects of the speed control system 10 of the present invention will be discussed in further detail below.

Figure 5:
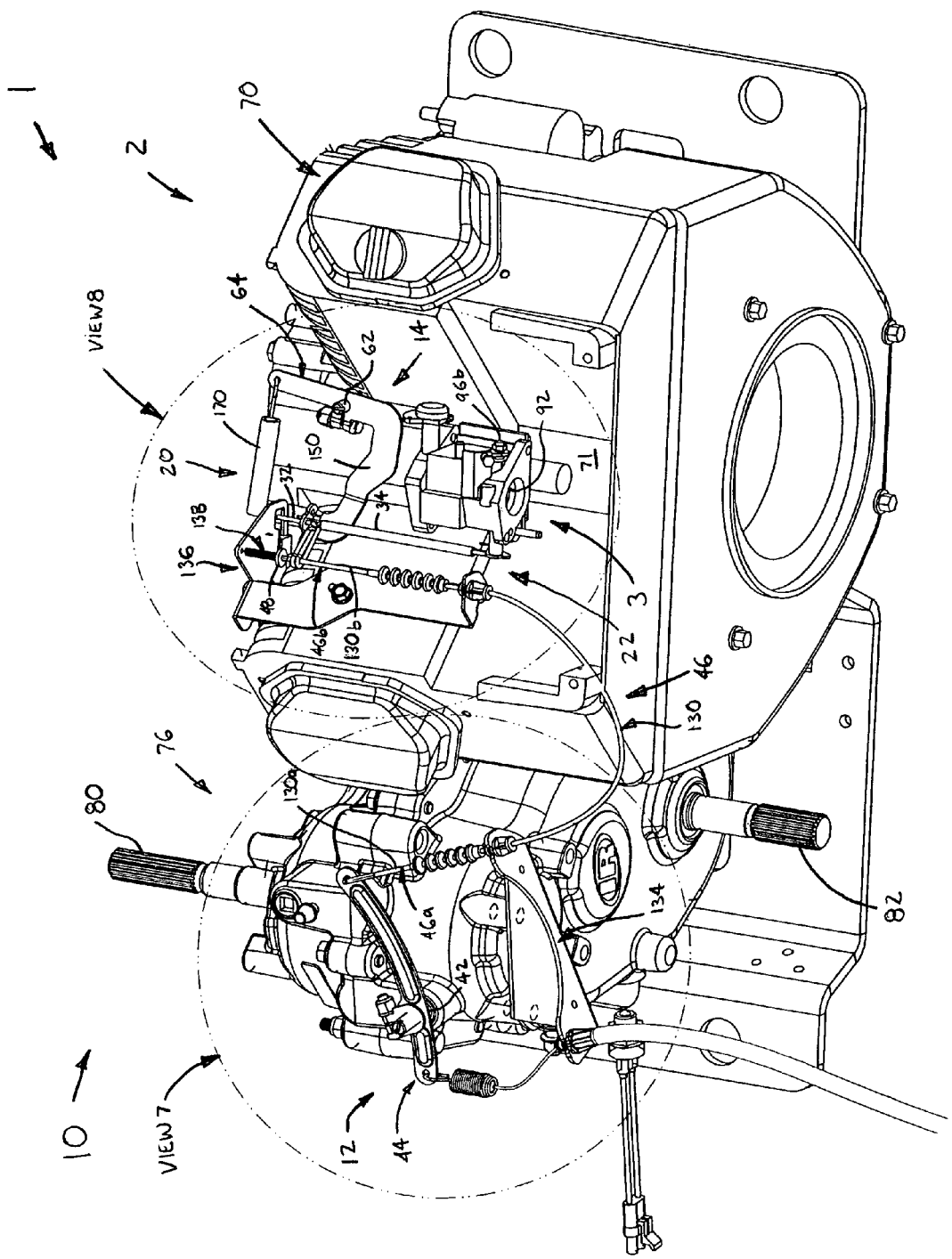
FIG. 5 is a top perspective view of the primary portion of the speed control system, shown mounted on a vehicle engine and transmission.
Figure 6:
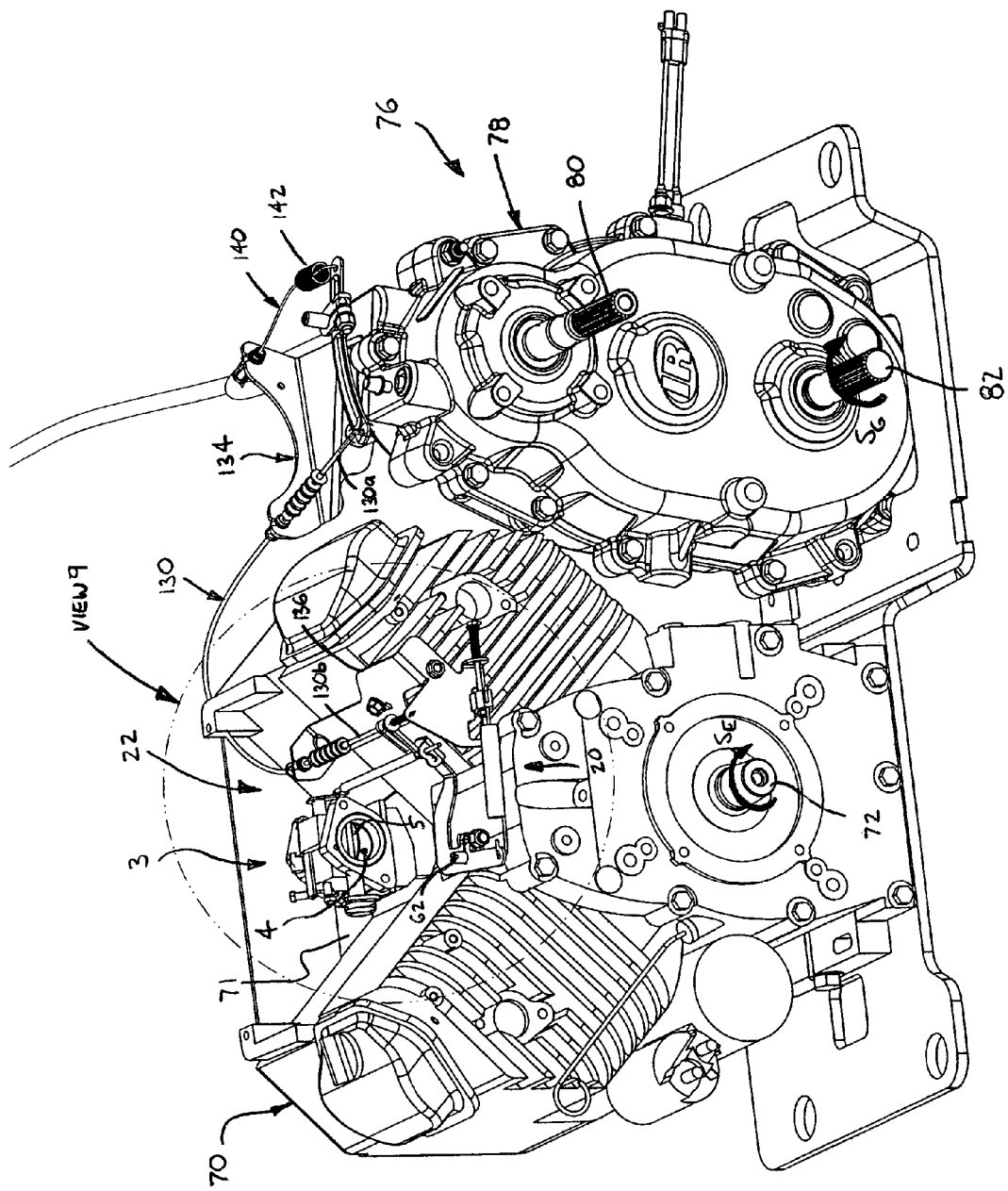
FIG. 6 is a front perspective view of the system shown in FIG. 5.
Figure 7:
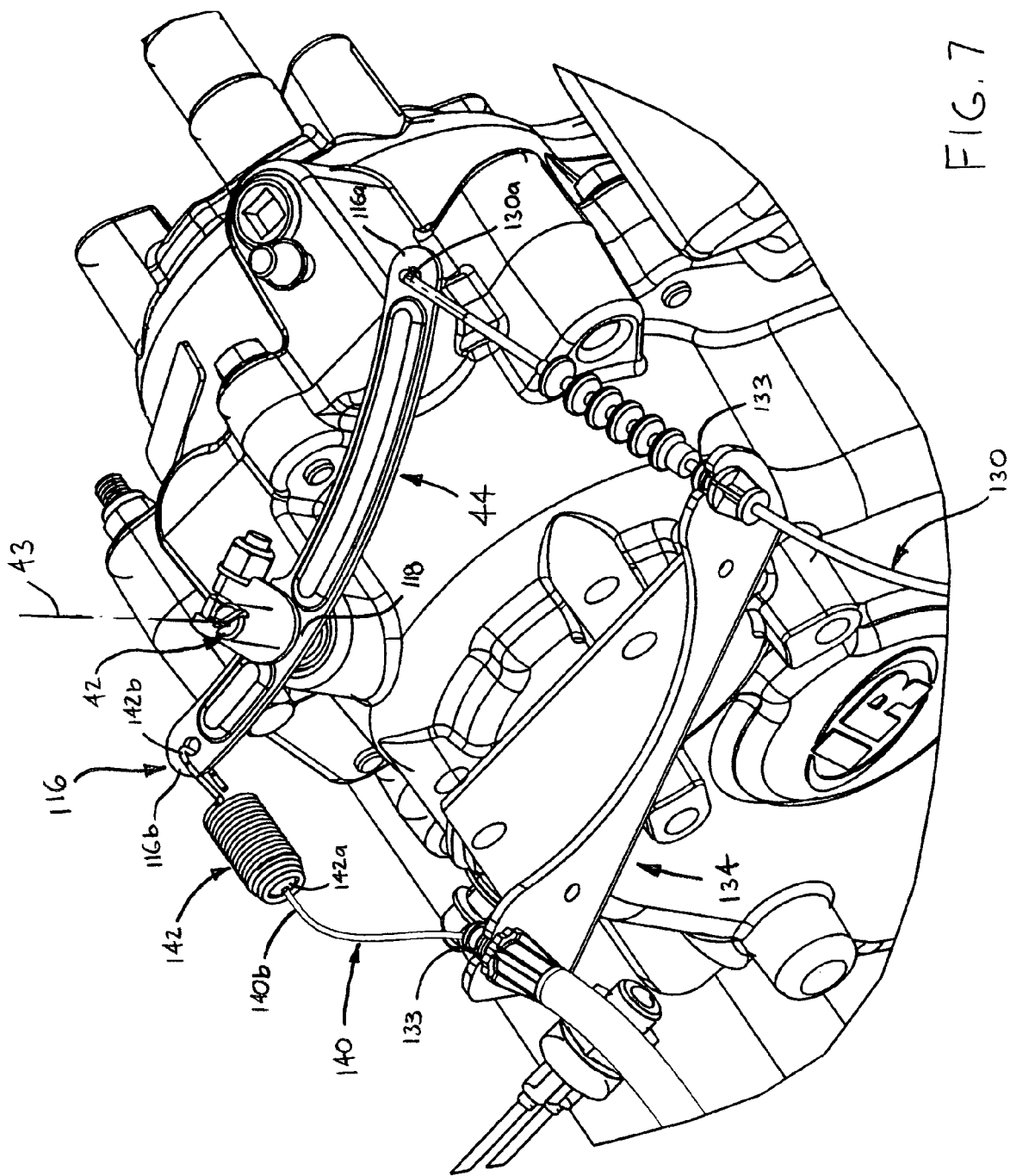
FIG. 7 is an enlarged, broken-away view of section 7 indicated in FIG. 5.
Figure 8:
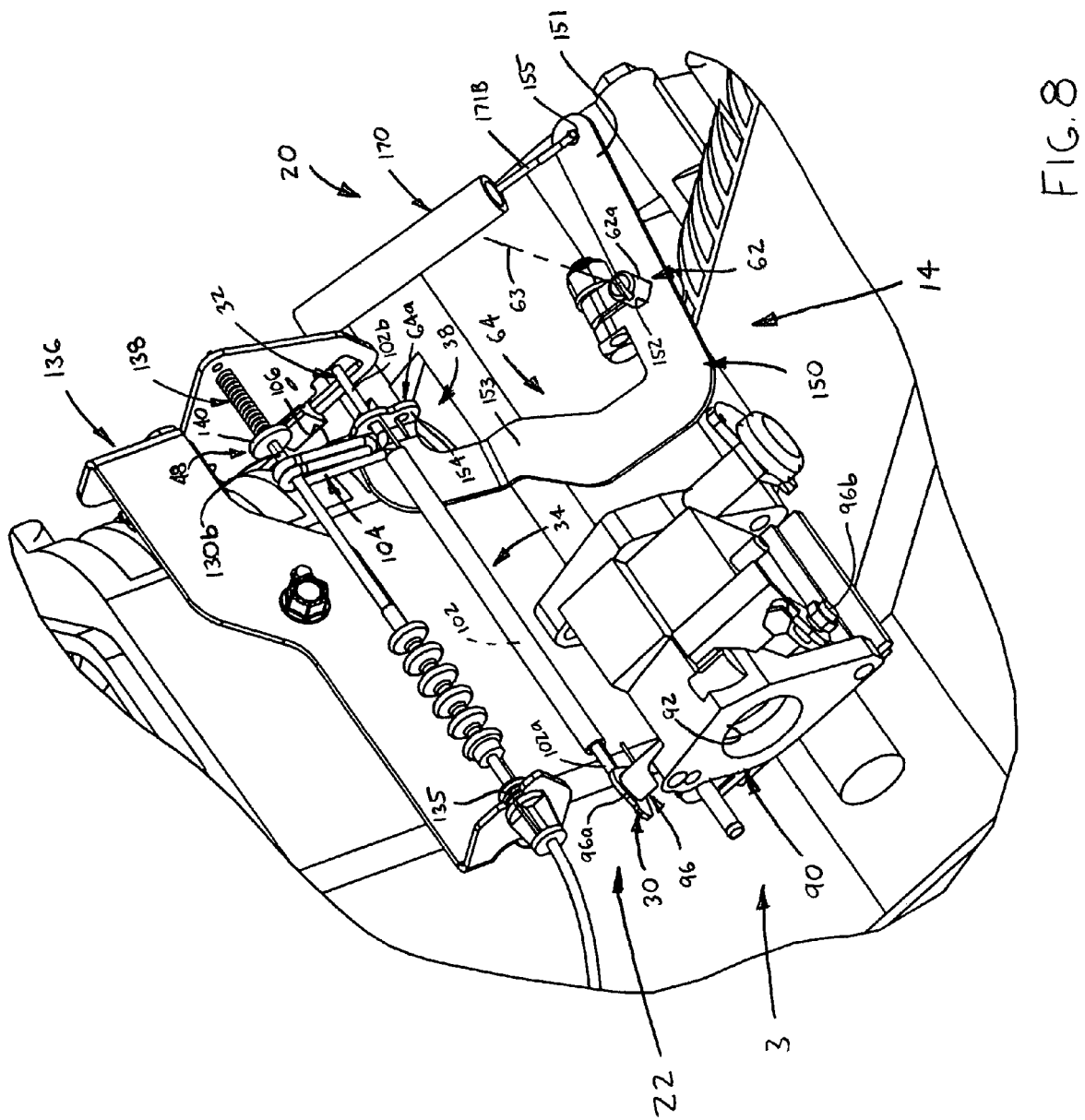
FIG. 8 is an enlarged, broken-away view of section 8 indicated in FIG. 5.

Referring to FIGS. 1, 5 and 6, the speed control system 10 is preferably used with a vehicle 1 constructed as a utility vehicle (as depicted), a golf car or a neighborhood electric vehicle ("NEV"), but may be used with any appropriate vehicle, such as a commercial automobile or SUV, a truck, etc. The engine 2 is preferably a conventional internal combustion engine including an engine block 70 and an output shaft 72 extending from the block 70, the carburetor 3 being mounted to an upper surface 71 of the block 70, as described below. The engine 2 also preferably includes a rotatable shaft 74 (FIG. 15) operably coupled with the output shaft 72, preferably through a gear train (not shown), and engaged with the engine speed sensor 60, as described below. The engine shaft 74 is rotatable about a central axis 75 at a speed proportional to the speed of the output shaft 72, the shaft speed providing the engine speed $S_E$ monitored by the ESL mechanism 14, as described above and in greater detail below.

Preferably, the vehicle 1 also includes a transmission 76 coupled with the engine 2 and including a housing 78, input and output shafts 80, 82 each rotatably disposed within the housing 78 and a gear train (not shown) operatively connecting the two shafts 80, 82. The input shaft 80 is operably connected with the engine output shaft 72, preferably by means of a continuously variable transmission (CVT) mechanism (not shown), such that rotation of the engine output shaft rotatably drives the transmission input shaft 80. Further, the output shaft 82 is operatively connected with at least one rotatable axle (not shown) of the vehicle 1, such that the engine drives the axle through the transmission to propel the vehicle 1. Furthermore, the transmission 76 also includes an intermediate shaft 84 (FIG. 14) rotatably engaged with the gear train, such that the rotation of the input shaft 80 drives the shaft 84, and engaged with the ground speed sensor 40, as described below. The shaft 84 is rotatable about a central axis 85 at a speed proportional to the speed of rotation of the vehicle axle(s), and thus proportional to the vehicle ground speed $S_G$, the shaft speed providing the ground speed $S_G$ monitored by the GSL mechanism 12.

Referring to FIGS. 6, 8, 9, 13 and 14, the carburetor 3 preferably includes a main body or block 90 mounted on the engine block upper surface 71 and a central bore 92 extending through the block 90 and providing the air intake port 4. The throttle plate 5 preferably includes a generally circular disk 94 mounted on a central shaft 96 and disposed within the bore 92. The throttle shaft 96 extends generally horizontally across the block central bore 92 and has opposing ends 96a, 96b, each shaft end 96a, 96b being rotatably disposed within the carburetor block 7 and extending at least partially externally of the block 90. With this structure, rotation of the throttle shaft 94 displaces the throttle plate 5 between the minimum open and maximum open positions $P_{MIN}$, $P_{MAX}$.

Referring to FIGS. 8-14, the crank 30 of the control linkage 22 preferably includes a generally elliptical plate 100 mounted to one end 96a of the throttle shaft 96. The crank plate 100 has a pair of openings 101A, 101B for connecting the push bar 32 and the spring shaft 34 with the crank 30. The push bar 32 preferably includes an elongated rod 102 having opposing ends 102a, 102b, a central axis 103 extending between the two ends 102a, 102b, and an offset section 104. The bar first end 102b has a hook portion 103 engaged with the first opening 101A of the crank plate 100 and the second end 102 extends through an opening 156A of the ESL control lever 64, as discussed below, to slidably couple the bar 32 with the lever 64. Further, the bar drive section 104 extends generally perpendicularly with respect to the bar axis 103 and provides a drive surface 106 contactable by the output portions 34, 36 of the GSL and ESL mechanisms 12, 14, as described above and in further detail below. The offset drive section 104 preferably includes a bended portion 105 forming an opening 107, a section of the GSL connector 46 extending through the drive section opening 107 to slidably couple the GSL mechanism 12 with the linkage 22, as described below. Furthermore, the spring shaft 34 is preferably formed as an extension spring 110 having opposing hooked ends 112A, 112B, and a central bore 114. The spring first hooked end 112A is engaged with the crank plate second opening 101B and the second hooked end 112B is engaged with the second opening 156B of the ESL control lever 64, such that the spring shaft 34 extends between and couples the lever 64 with the crank 30. The spring shaft 34 is preferably disposed about the push bar 32 such that a main section of the rod 102 extends through the central bore 114, although the spring shaft 34 may alternatively be located separate from and adjacent to the bar 32.

Figure 14:
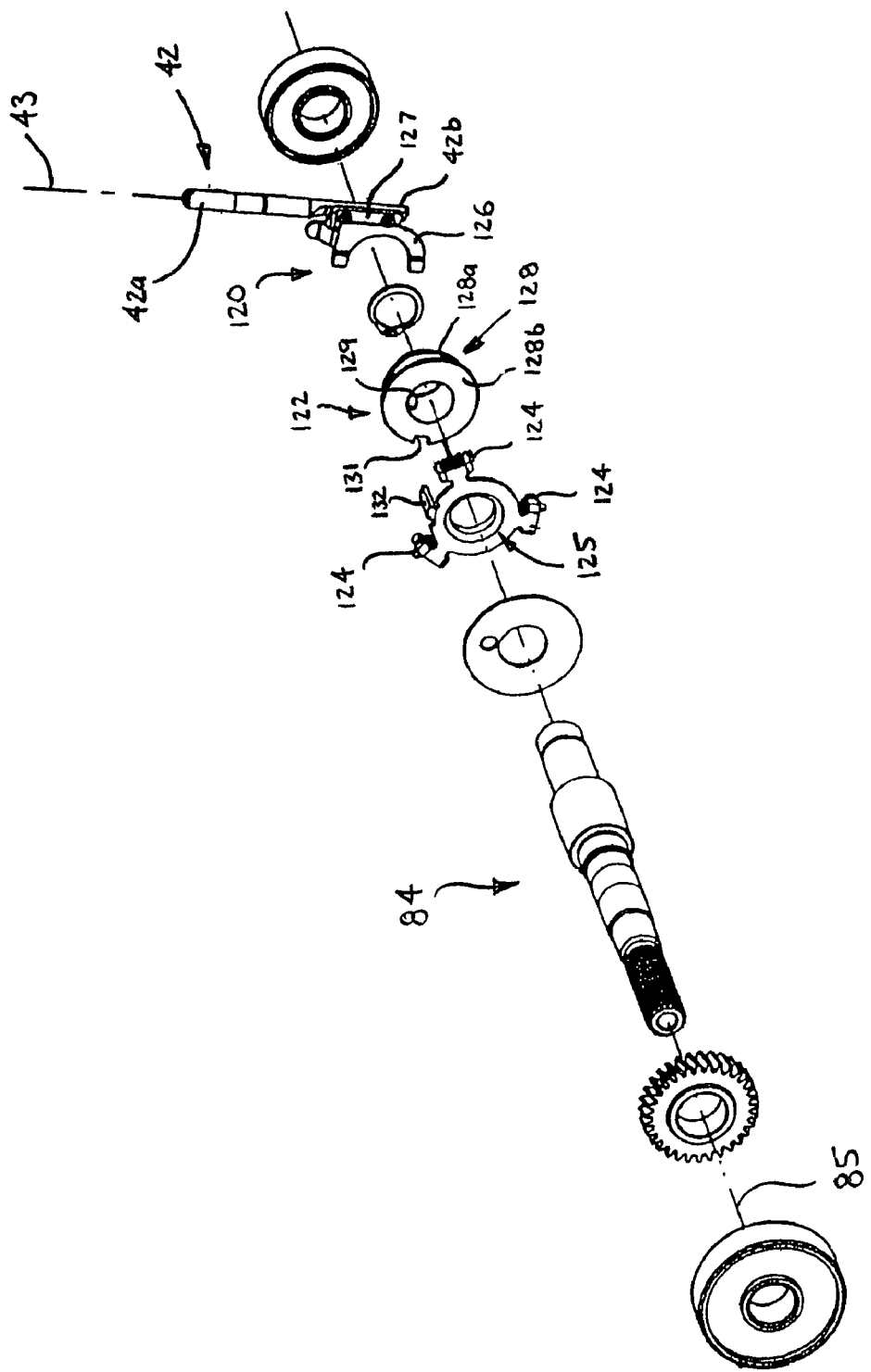
FIG. 14 is an exploded view of a ground speed sensor and coupled transmission shaft.
Figure 15:
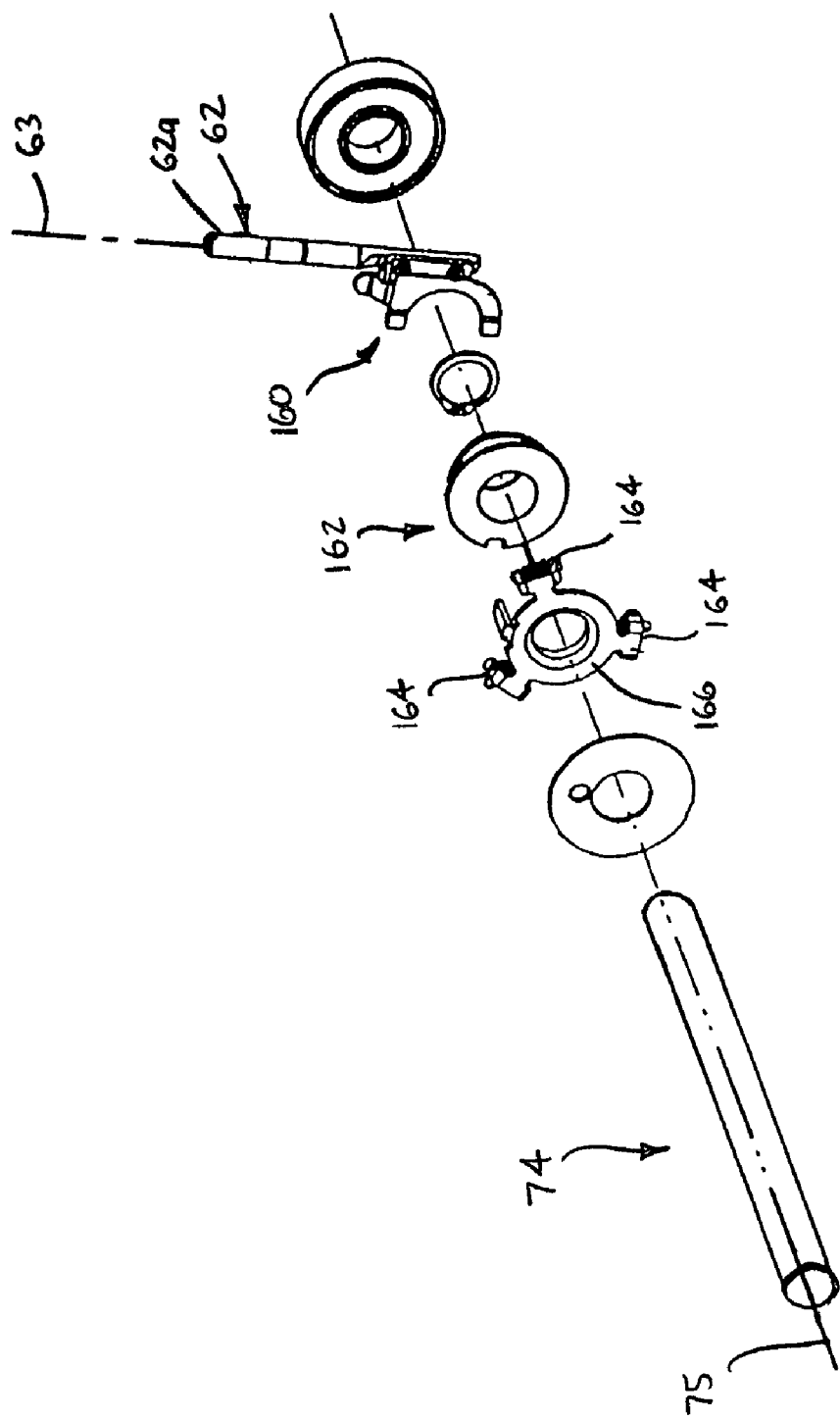
FIG. 15 is an exploded view of an engine speed sensor and coupled engine shaft.

Referring particularly to FIG. 14, the ground speed sensor 40 of the GSL mechanism 12 preferably includes a lever 120 connected with the sensor output shaft 42, a transfer member 122 slidably disposed on the transmission shaft 84 and contactable with the lever 120, and at least one and preferably plurality of pivotable weights 124 coupled with the shaft 84. The lever 120 extends at least partially in a direction generally perpendicular to the output shaft axis 43 and preferably includes a generally semicircular plate 126 with a rectangular tab 127 fixedly attached to a lower end 42a of the sensor shaft 42, the plate 126 extending at least partially about a portion of the transmission shaft 84. The transfer member 122 preferably includes a generally circular cylindrical block 128 having a central bore 129, the transmission shaft 84 extending through the bore 129, a guide slot 131, a first end 128a contactable with the lever 120, and a second end contactable by the one or more weights 124. Further, each weight 124 is preferably pivotally attached to a generally annular hub 125, the hub 125 being mounted on the transmission shaft 84 such that the transfer member 122 is disposed generally between the hub 125 and the lever 120. The hub 125 preferably has a guide portion 132 extending generally along the transmission shaft axis 85 and configured engage the transfer member slot to guide the transfer member 122 to slidably displace along the shaft axis 85.

Furthermore, each weight 124 is pivotable between most proximal and most distal positions with respect to the transmission shaft axis 85 and are each configured to pivot generally radially outwardly from the proximal position and toward the distal position as the shaft rotational speed increases. As such, the outward movement of the weights 124 displaces or "pushes" the transfer member 122 to slide along the axis 85 and against the lever 120, which pivotally displaces the lever 120 about the output shaft axis 43 so as to generate the sensor torque $T_{GS}$ on the output shaft 42. More specifically, the greater the shaft rotational speed, the greater the pivotal displacement of each weight 124 and the linear displacement of the transfer member 122, which increases the pivotal displacement of the lever 120 and thereby the sensor torque $T_{GS}$. Further, the lesser the transmission shaft speed, the lesser both the pivotal displacement of each weight 124 and the linear displacement of the transfer member 122, which thereby decreases the pivotal displacement of the lever 120 and thus the sensor torque $T_{GS}$.

Referring to FIGS. 5-9, the GSL control lever 44 preferably includes an elongated plate 116 having opposing first and second ends 116a, 116b and a central hub 118 with an opening 119. The hub 118 is disposed upon the sensor output shaft 42, such that the shaft upper end 42b extends through the opening 119, to fixedly couple the lever 44 and shaft 42. The GSL connector 46 preferably includes a cable 130 having a first end 130a attached to one lever end 116a and providing the connector first end 46a, and a second end 130b coupled with the control linkage 22 and providing the connector second end 46b. Preferably, the speed control system 10 further includes a first mounting bracket 134 disposed on the transmission housing 78 and a second mounting bracket 136 disposed on the engine block 70, the cable 130 being coupled with the two brackets 134, 136 to secure the connector 46 with the transmission 76 and engine 2. More specifically, each bracket 134, 136 includes at least one connector opening 133, 135, respectively, and the opposing cable ends 124a, 124b extend through each opening 133, 135, respectively. Further, the cable second end 124b is also connected with the second bracket 136 by a return spring 138 and a portion of the cable 124 extends through the push bar drive section opening 107 to slidably couple the connector 46 with the linkage 22. Further, the connector stop 48 preferably includes a generally circular disk 140 fixedly attached to the cable second end 124b and contactable with the push bar drive surface 106.

With the above structure, rotation of the GSL lever 44 in the first angular direction $A_1$ (i.e., when $T_{GS}>T_A$) permits the return spring 138 to pull the cable 130 to displace through the push bar drive portion 32 generally in the second direction $L_2$ along the linkage axis 23. Such cable movement causes the stop 48 to displace away from the push bar drive surface 106, enabling the spring shaft 34 to displace the linkage 22 in the second direction $L_2$. As such, the spring shaft 34 pulls the linkage crank 30 in the second angular direction $C_{C2}$ (see FIG. 10) so that the crank 30 moves the throttle plate 5 toward the minimum position $P_{MIN}$. Alternatively, rotation of the GSL lever 44 in the second angular direction $A_2$ (i.e., when $T_A>T_{GS}$) causes the cable 130 to displace the stop 48 in the first linkage direction $L_1$ as the return spring 138 is extended. The stop 48 engages against the push bar drive surface 106 so that the push bar 32 is displaced in the first direction $L_1$. Thereby, the push bar 32 pivots the crank 30 in the first direction $C_{C1}$ (see FIG. 10) to displace the throttle plate 5 toward the maximum position $P_{MAX}$, while the spring shaft 34 is extended.

Referring to FIGS. 2-7, the accelerator pedal 50 is preferably disposed in an operator compartment (not shown) of the vehicle 1 and is biased toward the pedal initial position $I_I$ (e.g., by a spring—not shown), such that pedal 50 returns to the initial position $I_I$ upon release by the user. The accelerator connector 52 preferably includes a cable 140 having a first end 140a connected with the pedal 50 and an opposing second end 140b, and a spring shaft 142 extending between the cable second end 140b and the GSL control lever 44. More specifically, a portion of the accelerator cable 140 extends through another opening 133 in the first mounting bracket 134 to secure the connector 52 with the transmission. Further, the spring shaft 142 has a first end 142a attached to the cable second end 140b and a second end 142b attached to the control lever second end 116b.

With this structure, displacement of the pedal 50 toward the maximum displaced position $I_D$ (see FIG. 3) pulls the cable 140 in a direction generally away from the control lever 44, causing the spring shaft 142 to first extend, and then exert force on the lever 44 (generating the accelerator torque $T_A$) so as to pull the lever 44 to pivot in the second angular direction $A_2$ about the shaft axis 43. Such lever movement displaces the GSL connector 46 to move the linkage push bar 32 in the first direction $L_2$, thereby moving the throttle plate 5 toward the maximum open position $P_{MAX}$. When the pedal 50 is displaced back toward the initial position $I_I$, the resulting reduction of the accelerator torque $T_A$ enables the connector return spring 138 to displace the GSL connector 46 in a direction generally away from the control lever 44. Such movement of the GSL connector 46 causes the control lever 44 to pivot in the first angular direction $A_1$ and pull the accelerator connector 52 in a direction generally toward the lever 44. Further, when the GSL sensor torque $T_{GS}$ exceeds the accelerator torque $T_A$ (i.e., at higher ground speeds) the resulting pivotal movement of the control lever 44 in the first direction $A_1$ causes the spring shaft 142 to extend without displacing the accelerator cable 140.

Referring now to FIGS. 2-6, 8 and 9, the ESL control lever 64 preferably includes an angled plate 150 having first and second arms 151, 153, a connective opening 152 in the first arm 151, and an engagement tab 154 attached to the second arm 153. The first arm 151 is disposed on the engine speed sensor shaft 62 such that the shaft upper end 62a extends through the arm connective opening 152. The engagement tab 154 is located at the outer end 153a of the second arm 153 and provides the ESL output portion 38 engageable with the linkage 22, as discussed above. More specifically, the engagement tab 154 is generally rectangular and extends generally vertically with respect to the second arm 153. The tab 154 includes the two connective openings 156A, 156B respectively engaged with the push bar free end 102b and the spring shaft second hooked end 112B, as described above, and further includes a drive surface 157. The tab drive surface 157 is contactable with the push bar drive section 104 to displace or "push" the bar 32 in the first axial direction $L_1$ when the lever 64 pivots in the second angular direction $A_2$, thereby moving the throttle plate 5 toward the maximum position $P_{MAX}$. Alternatively, when the lever 64 pivots in the second direction $A_2$, the tab 154 pulls the linkage spring shaft 34 to displace in the second axial direction $L_2$, thus moving the throttle plate 5 toward the minimum position $P_{MIN}$.

Further, the engine speed sensor 60 of the ESL mechanism 14 is preferably generally identically constructed, and operates substantially similarly, as the ground speed sensor 40 discussed above. Specifically, the engine speed sensor 60 preferably includes a lever 160 connected with the sensor output shaft 62, a transfer member 162 slidably disposed on the engine shaft 74, and contactable with the lever 160, and at least one and preferably three weights 164 pivotally mounted on a hub 166. As with the GSL sensor 40, the weights 164 pivot outwardly from an initial position by an amount proportional to the engine shaft speed, to proportionately displace the transfer member 162 and pivot the lever 160. The movement of the lever 160 thereby generates a torque $T_{ES}$ on the output shaft 64 that is proportional to the engine speed $S_E$, and most preferably to the engine speed squared ($S_E^2$). As the engine speed sensor 60 is generally identical to the ground speed sensor 40, further description of the sensor 60 is unnecessary and beyond the scope of this disclosure.

Figure 9:
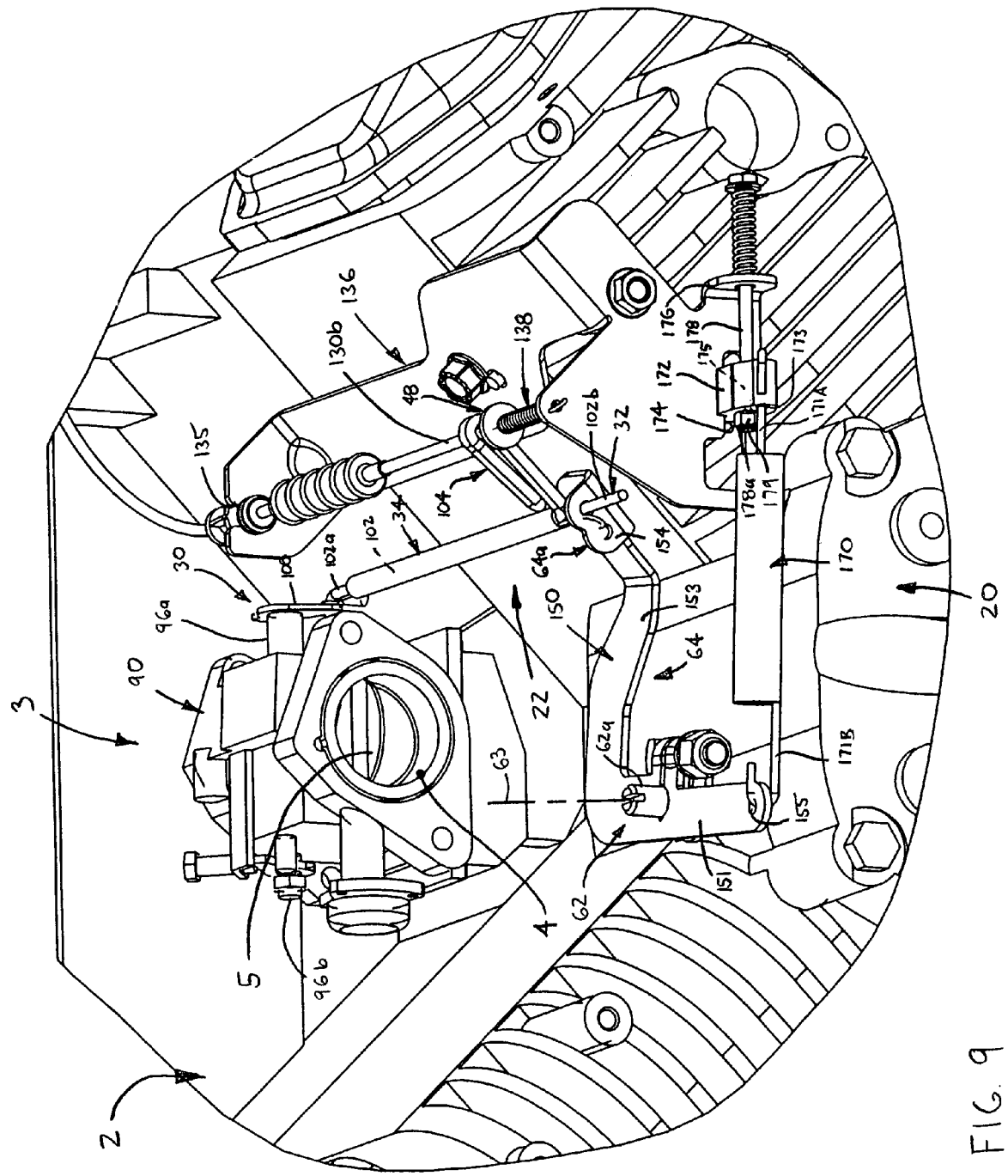
FIG. 9 is an enlarged, broken-away view of section 9 indicated in FIG. 6.
Figure 10:
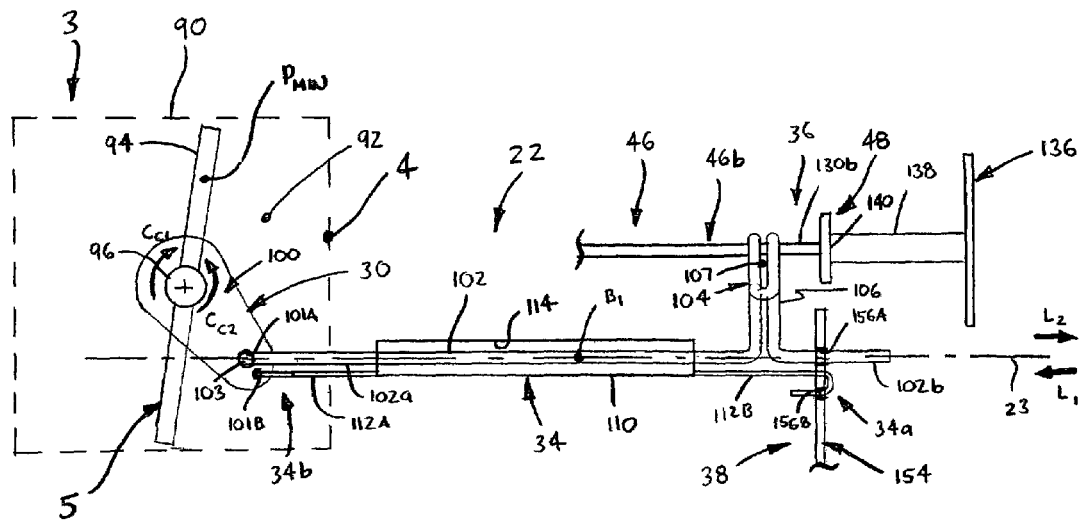
FIG. 10 is a greatly enlarged, broken-away side plan view of a control linkage and engaged portions of the ground speed limiter mechanism and the engine speed limiter mechanism, showing the linkage in a first configuration.

Furthermore, the idler 20 preferably includes an extension spring 170 having opposing hooked ends 171A, 171B and extending between the second mounting bracket 136 and the ESL control lever 64. More specifically, the idler 20 preferably includes an attachment block 172 disposed on the bracket 136 and having a connective opening 173, the idler spring first hooked end 171A being engaged with the opening 173, and the spring second hooked end 171A is engaged with an opening 155 on the lever first arm 151, as best shown in FIG. 9. Preferably, the attachment block 172 is adjustably connected with the mounting bracket 136 such that a spacing distance (not indicated) between the block 172 and the shaft axis 63 is variable, which varies the throttle idle position $P_I$ and thus the engine idle speed $S_{EI}$. Specifically, the bracket 136 includes a slotted opening 174, a portion of the block 172 being disposed in the opening 174, and a tab 176. A rod 178 with a threaded end 178a extends between the bracket tab 176 and a through a hole 175 in the block 172 and a nut 179 engages with the rod threaded end 178a. As such, displacement of the nut 179 along the rod 178 displaces the block 172 within the opening 174 to adjust the spacing distance.

With the above ESL mechanism and idler structures, rotation of the ESL lever 64 in the second angular direction $A_2$ (i.e., when $T_I > T_{ES}$) causes the engagement tab 154 to slide upon the push rod second end 102b until the tab drive surface 157 contacts the bar drive section 104. At which point, further pivotal movement of the control lever 64 displaces the bar 32 in the first direction $L_1$ to thereby move the throttle plate 5 toward the throttle idle position $P_I$. Alternatively, rotation of the control lever 64 in the first angular direction $A_2$ (i.e., when $T_{ES} > T_I$) causes the engagement tab 154 to pivot generally away from the throttle plate 5. Thereby, the spring shaft 34 is displaced or pulled in the second direction $L_2$ along the linkage axis 23, which pivots the crank 30 and moves the throttle plate 5 toward the minimum position $P_{MIN}$ when the GSL mechanism 12 has reduced the accelerator force on the linkage 22, as discussed above. Such movement of the spring shaft 34 and crank 30 also displaces the push bar 32 toward the bar first position $B_1$.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as recited in the appended claims.

I claim:

1. A speed control system for a vehicle, the vehicle having an engine including a carburetor with a throttle plate, the plate being moveable between a closed position and a maximum open position, the speed control system comprising:

a ground speed limiter mechanism operatively coupled with the throttle plate and configured to displace the plate toward the closed position as ground speed of the vehicle approaches a predetermined maximum value;

an engine speed limiter mechanism operatively coupled with the throttle plate and configured to displace the plate toward the closed position as a speed of the engine approaches a predetermined maximum value; and a control linkage connected with the throttle plate and moveable between first and second configurations so as to move the throttle plate between the closed and maximum open positions, the control linkage being operably coupled with the ground speed limiter mechanism such that the ground speed limiter mechanism moves the linkage between the linkage first and second configurations to move the throttle plate, and being operably coupled with the engine speed limiter mechanism such that the engine speed limiter mechanism moves the linkage between the linkage first and second configurations to move the throttle plate;

wherein the control linkage includes:

a pivotable crank operatively connected with the throttle plate such that pivotal displacement of the crank displaces the throttle plate between the closed and maximum open positions;

a push bar connected with the crank, displaceable between first and second positions, and separately engageable with an output portion of the ground speed limiter mechanism and with an output portion of the engine speed limiter mechanism, the rush bar being displaceable toward the second position by movement of at least one engaged output portion in a first direction generally toward the crank such that the bar pivots the crank in a first angular direction so as to move the throttle plate toward the maximum open position; and a spring shaft having a first end connected with the crank and a second end connected with the output portion of the engine speed limiter mechanism, the spring shaft being configured to pivot the crank in a second, opposing angular direction so as to move the throttle plate toward the closed position when the one engaged output portion displaces in a second, opposing direction generally away from the crank.

2. The speed control system as recited in claim 1 wherein the ground speed limiter mechanism is configured to prevent vehicle ground speed from exceeding the ground speed maximum value and the engine speed limiter mechanism is configured to prevent the engine speed from exceeding the engine speed maximum value.

3. The speed control system as recited in claim 1 further comprising an accelerator mechanism operatively coupled with the throttle plate and having an input member operable by a user, the accelerator mechanism being configured to displace the throttle plate between the closed and the maximum open positions to adjust vehicle ground speed.

4. The speed control system as recited in claim 3 wherein the accelerator input member includes a pedal displaceable between an initial position and a maximum displaced position, the accelerator mechanism being configured to displace the throttle plate toward the maximum open position when the pedal displaces toward the maximum displaced position and to displace the throttle plate toward the closed position when the pedal displaces toward the initial position.

5. The speed control system as recited in claim 3 wherein:

the ground speed limiter mechanism includes a moveable member connected with the throttle plate such that displacement of the moveable member moves the throttle plate between the open and closed positions; and the accelerator mechanism is connected with the ground speed mechanism moveable member and configured to displace the moveable member to move the throttle plate between the open and closed positions.

6. The speed control system as recited in claim 1 further comprising an idler operatively coupled with the throttle plate and configured to displace the throttle plate to an idle position, the idle position being located between the plate closed and maximum open positions.

7. The speed control system as recited in claim 6 wherein:

the engine speed limiter mechanism includes a moveable member connected with the throttle plate such that displacement of the moveable member moves the throttle plate between the closed and maximum open positions; and the idler mechanism is connected with the engine speed mechanism moveable member and configured to displace the moveable member to move the throttle plate between the closed and maximum open positions.

8. The speed control system as recited in claim 1 further comprising an accelerator mechanism operatively coupled with the push bar and having an input member operable by a user, the accelerator mechanism being configured to displace the push bar from the bar first position to the bar second position to move the throttle plate toward the maximum open position.

9. The speed control system as recited in claim 8 wherein:

the ground speed limiter mechanism includes a ground speed sensor having an output shaft with a central axis and being angularly displaceable about the axis, the speed sensor device being configured to generate a torque on the output shaft in a first direction about the axis, the speed sensor torque being proportional to ground speed, a control lever mounted on the output shaft so as to be pivotable about the shaft axis, the sensor torque causing the shaft to pivot the lever in the first direction, and a connector having a first end connected with the control lever and a second end connected with the push bar; and the accelerator mechanism is connected with the control lever and is configured to generate an accelerator torque on the output shaft in a second direction about the sensor shaft axis such that when the accelerator torque is greater than the speed sensor torque, the control lever displaces the connector second end such that the push bar displaces the throttle plate toward the maximum open position and when the speed accelerator torque is lesser than the speed sensor torque, the control lever displaces the connector second end such that the spring shaft displaces the throttle plate toward the closed position.

10. The speed control system as recited in claim 9 wherein:

the accelerator input member includes a pedal displaceable between an initial position and a maximum displaced position;

the accelerator mechanism further includes a connector having a first end connected with the user input member and a second end connected with the control lever such that displacement of the pedal pivots the control lever about the shaft axis, the value of the accelerator torque increasing when the pedal displaces toward the maximum displaced position and decreasing when the pedal displaces toward the initial position; and the ground speed sensor is configured to increase the speed sensor torque with increasing ground speed such that when the speed approaches the predetermined speed value, the value of the speed sensor torque exceeds the value of the accelerator torque so that the output shaft rotates in the first direction to move the throttle plate toward the closed position.

11. The speed control system as recited in claim 9 wherein the vehicle includes a transmission with a shaft rotatable about a central axis, the shaft rotating about the axis at a speed proportional to the vehicle ground speed, and the ground speed sensor further includes:

a lever connected with the sensor shaft and extending at least partially in a direction generally perpendicular to the output shaft axis;

a transfer member slidably disposed upon the transmission shaft and contactable with the lever; and at least one weight coupled with the transmission shaft, pivotable between most proximal and most distal positions with respect to the shaft axis, and contactable with the transfer member, the weight being configured to pivot generally radially outwardly from the proximal position and toward the distal position as the shaft rotational speed increases such that the weight displaces the transfer member against the lever member to pivotally displace the lever about the output shaft axis so as to generate the sensor torque on the output shaft.

12. The speed control system as recited in claim 11 wherein the ground speed sensor further includes:

a hub mounted on the transmission shaft such that the slide member is disposed generally between the hub and the lever, the hub having a guide portion extending generally along the transmission shaft axis and configured to guide the transfer member to slidably displace along the shaft axis, the weight being pivotally connected with the hub; and at least one other weight pivotally connected with the hub so as to be spaced circumferentially about the transmission shaft axis from the weight, the other weight being displaceable between most proximal and most distal positions with respect to the transmission shaft axis, contactable with the transfer member, and configured to pivot generally radially outwardly from the proximal position and toward the distal position as the transmission shaft rotational speed increases such that the two weights displace the transfer member against the lever to pivotally displace the lever about the output shaft axis.

13. The speed control system as recited in claim 1 further comprising an idler operatively coupled with the linkage push bar and configured to bias the bar from the bar first position toward a bar intermediate position, the bar intermediate position being located between the first and second positions such that the throttle plate is located between the closed and maximum open positions.

14. The speed control system as recited in claim 13 wherein:

the engine speed limiter mechanism includes an engine speed sensor having an output shaft with a central axis and being angularly displaceable about the axis, the speed sensor device being configured to generate a torque on the output shaft in a first direction about the axis, the speed sensor torque being proportional to the engine speed, a control lever mounted on the output shaft so as to be pivotable about the shaft axis, the sensor torque causing the shaft to pivot the lever in the first direction, the lever being coupled with the push bar and with the spring shaft; and the idler is connected with the control lever and is configured to generate an idler torque on the output shaft in a second direction about the sensor shaft axis such that when the idler torque is greater than the speed sensor torque, the control lever pivots in a first direction to displace the push bar to the bar second position so as to move the throttle plate toward the maximum open position and when the idler torque is lesser than the speed sensor torque, the control lever pivots in a second direction to displace the spring shaft so as to move the throttle plate toward the closed position.

15. The speed control system as recited in claim 14 wherein the engine speed limiter mechanism includes:

an engine speed sensor having an output shaft with a central axis and being angularly displaceable about the axis, the speed sensor device being configured to generate a torque on the output shaft in a first direction about the axis, the speed sensor torque being proportional to the engine speed;

a control lever mounted on the output shaft so as to be pivotable about the shaft axis, the sensor torque causing the shaft to pivot the lever in the first direction; and a connector having a first end connected with the control lever and a second end connected with the throttle plate such that pivotal displacement of the control lever displaces the throttle plate between the closed and maximum open positions.

16. The speed control system as recited in claim 15 wherein the engine includes a shaft rotatable about a central axis, the shaft rotating about the axis at a speed proportional to the engine speed, and the engine speed sensor further includes:

a lever connected with the sensor shaft and extending at least partially in a direction generally perpendicular to the output shaft axis;

a transfer member slidably disposed upon the engine shaft and contactable with the lever; and at least one weight coupled with the engine shaft, pivotable between most proximal and most distal positions with respect to the shaft axis, and contactable with the transfer member, the weight being configured to pivot generally radially outwardly from the proximal position and toward the distal position as the shaft rotational speed increases such that the weight displaces the transfer member against the lever member to pivotally displace the lever about the output shaft axis so as to generate the sensor torque on the output shaft.

* * * * *